United States Patent [19]

Edgin

[11] Patent Number: 5,279,021
[45] Date of Patent: Jan. 18, 1994

[54] ARTICLE RETAINING APPARATUS HAVING PULL-RELEASE/PUSH-RETAIN STRUCTURE AND METHOD OF USING

[76] Inventor: Howard L. Edgin, 2451 W. Bavino Way, Tucson, Ariz. 85741

[21] Appl. No.: 935,191

[22] Filed: Aug. 26, 1992

[51] Int. Cl.⁵ .............................................. A44B 17/00
[52] U.S. Cl. ........................................ 24/647; 24/664; 24/3 K
[58] Field of Search ................ 24/647, 643, 597, 598, 24/3; 70/459

[56] References Cited

U.S. PATENT DOCUMENTS

| | | |
|---|---|---|
| 928,006 | 7/1909 | Thomas . |
| 1,463,071 | 7/1923 | Dow et al. . |
| 1,481,126 | 7/1923 | Cupp . |
| 2,531,325 | 11/1950 | De Cesaris .......................... 70/459 |
| 2,896,288 | 7/1959 | Davis ................................. 24/230 |
| 3,540,089 | 11/1970 | Franklin ............................. 24/602 |
| 4,113,156 | 9/1978 | Brito .................................... 224/5 |
| 4,893,383 | 1/1990 | Quickel .............................. 24/647 |
| 4,924,562 | 5/1990 | Pogharian .......................... 24/647 |
| 5,018,254 | 5/1991 | Brodin .............................. 24/601.5 |
| 5,027,477 | 7/1991 | Seron ................................. 24/3 B |

FOREIGN PATENT DOCUMENTS 1315413 12/1962 France ............................... 24/602

Primary Examiner—Victor N. Sakran
Attorney, Agent, or Firm—Victor Flores

[57] ABSTRACT

An article retaining apparatus having structure that facilitates push-type securement or manipulated latch-type securement of an article, such as keys, key rings and the like, and which also facilitates tug release, or manipulated latch release of a retained article. The apparatus engages an article at the apparatus's receiving-end, which includes a lower, beveled entry portion, that coacts with a beveled hook-end portion of a pivotally attached latch. Upon the latch being urged at the receiving-end by an article to be retained, a moment produce pivotal motion of the spring-loaded latching member towards a casing end portion to effect the push-type securement of the article. Similarly, during a tug release of the retained article, an inner sloped surface on the latch's hook-end portion coacts with an edge of an elongated C-shaped article retaining region to produce pivotal motion of the spring-loaded latching member towards the casing end portion to effect the tug release of the article. The spring-loaded latch can also be manipulated to produce the same moment on the spring-loaded latch to either engage or release an article.

7 Claims, 2 Drawing Sheets

ARTICLE RETAINING APPARATUS HAVING PULL-RELEASE/PUSH-RETAIN STRUCTURE AND METHOD OF USING

FIELD OF THE INVENTION

The present invention relates to latching mechanisms used for detachable securement of loose personal articles, such as keys, key chains, rings, or of other types of articles capable of being secured to the latching mechanism. More particularly, the present invention relates to latching mechanisms that have structure which facilitate a quick engagement and release of an article. Even more particularly, the present invention relates to latching mechanisms which facilitate a push-type engagement of an article and which also facilitate a tug or pull-type release of a secured article, and which further have manipulation means for alternative engagement and release of an article.

BACKGROUND OF THE INVENTION

The prior art teaches latching mechanisms which fall into three categories, namely those that require manipulation of a part of the mechanism for the securement and release of an article, those that facilitate a push-type securement of an article (either by clipping-type action or by forced latching action), and those that facilitate tug-type release of an article. However, the prior art does not teach the combination of manipulated engagement and securement, push-type securement and tug-type release securement of an article.

Typical of latching mechanisms that facilitate manipulated type securement and engagement of articles are U.S. Pat. Nos. 1,463,071 to G. B. N. Dow et al. and U.S. Pat. No. 1,481,126 to Cupp. The '071 patent teaches an antiskid chain hook having a blade body that secures an object in a recess portion of the housing and which requires manipulation of a chain link to overcome the strain exerted on the blade. The '126 patent teaches a chain coupling having a hook arrangement that engages or releases a link by tension manipulated means. Neither the '071 or the '126 devices facilitate a push-type engagement or a tug-type release of an object being secured.

Typical of latching mechanisms that facilitate a push-type securement of an article (either by clipping-type action or by forced latching action), are U.S. Pat. Nos. 928,006, 2,531,325, 2,896,288 and 4,113,156. The '006 patent teaches a belt-carried device having a curved hook that coacts with an elongated spring member spring member to facilitate a push-type clipping engagement of an article. Release of the article requires manipulation of the hook to release the tension exerted by the spring member. The '325 patent teaches a key holder having a spring-loaded latch coacting with a shank member to retain a key. The engagement and release of the key article requires manipulation which is considered more extensive than a mere pushing action. The '156 patent teaches a key ring holder having a spring-loaded lever coacting with a hook member to positively secure an article. The spring-loaded lever must be manipulated to release the article. The '288 patent teaches a connector used in the webbing industry having a spring-loaded hook member with beveled side walls to effect the engagement by a simple push. The release of the retained coupling requires manipulation of the spring-loaded member.

A known latching mechanism that facilitates tug-type release of an article includes the tug release connector taught by U.S. Pat. No. 5,018,254. The '254 connector teaches a spring-loaded shaft coacting with a lip portion of a hollow body member to retain the free end of a hinged clip member which secures articles. Engagement or release of an article requires tugging on the clip member to extend the shaft and the hingedly connected clip member away from the lip portion. The device does not teach a push-type engagement.

Thus, a need is seen to exist for a latching mechanism that facilitates a push-type engagement of an article, which facilitates a tug-type release of a secured article, and which further facilitates engagement and release of an article by an alternative manipulating means.

SUMMARY OF THE INVENTION

Accordingly, the primary object of the present invention is to provide an article latching apparatus having structure that facilitates engagement and release of the article in a manner which combines controlled manipulated means, push-type securement and tug or pull-type release.

Another object of the present invention is to provide an article latching mechanism whose latching portion is formed having a beveled body structure which facilitates push-type securement and pull-type release of an article.

A related object of the present invention is to provide an article latching mechanism having the foregoing feature for use with personal articles such as key rings, keys, chains and the like.

The foregoing objects are accomplished by providing an article retaining apparatus having structure that facilitates either a spontaneous push-type securement, or a manipulated latch-type securement of an article, and which also facilitates either a spontaneous pull-type release, or a manipulated latch release of a retained article. The structure includes an elongated U-shaped housing member which encases a spring-loaded, pivotally secured article latching member. The housing member includes an article receiving-end portion and a latch manipulation cutaway formation. The article latching member is formed having a hook-end body portion, a pivot portion, a spring clip seating portion, and a latch manipulation portion. The article receiving-end portion is formed having a lower, beveled entry portion, and an upper, latch hook-end housing portion. The latching member's hook-end body portion is formed having an outer beveled surface and an adjoining inner sloped surface. In an assembled state of the apparatus, and during securement of an article, the receiving-end's lower beveled portion coacts with the latch's hook-end outer beveled surface, which, upon being urged by an article to be retained, produces a moment which results in a pivotal motion of the spring-loaded latching member towards the latch hook-end housing portion to effect the push-type securement of the article. Similarly, during a pull-type release of the retained article, the inner sloped surface on the latch's hook-end in conjunction with an edge of a C-shaped article retaining region coacts with the article being released to produce the moment to produce the pivotal motion of the spring-loaded latching member towards the hook-end housing portion to effect the pull-type release of the article. In an assembled state, the latch manipulation portion protrudes into the latch manipulation cutaway formation. Upon the latch manipulation portion being urged downward, a moment is produced which causes the hook-end portion to be pivotally moved towards the hook-end housing portion to facilitate a non-forcible, unimpeded securement or unimpeded release of an article.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figure 1:
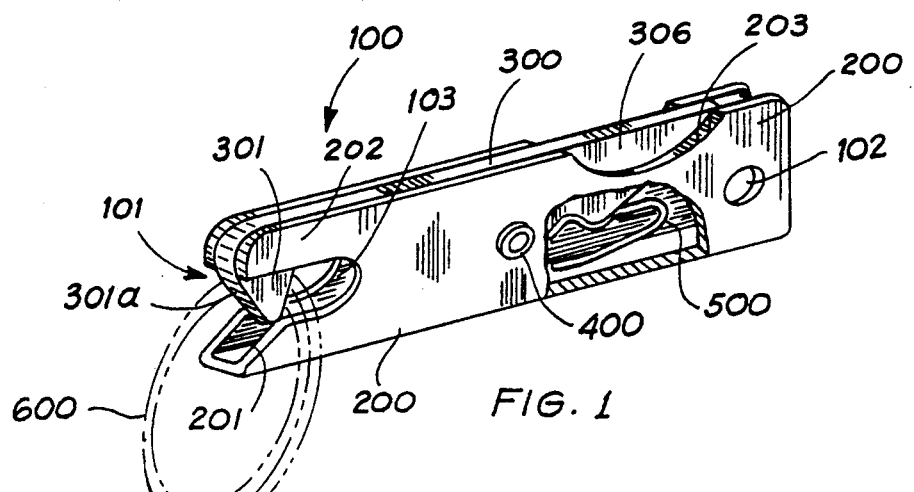
FIG. 1 is a perspective view of the article retaining apparatus of the present invention illustrating a ring article retained by a spring-loaded latch at a receiving-end according to the present invention and also illustrating a secondary article retaining means.

Referring now to FIG. 1 showing a perspective view of the article retaining apparatus 100 according to the present invention. Apparatus 100 is shown comprising a housing member 200 and a spring-loaded latch member 300. Latch member 300 is pivotally encased in housing member 200 by means of a pivot 400 kept in a spring-loaded state by spring member 500. Housing member 200 and encased latch member 300 form a first and second set of complementary latching and unlatching structural arrangement for securing article 600, shown in the form of a ring used to keep keys. The first set of complementary latching and unlatching structural arrangement comprises an engagement means for facilitating a push-type securement of an article, and a disengagement means for facilitating a pull-type release of a secured article. The second set of complementary latching and unlatching structural arrangement comprises a cutaway formation 203 on housing 200 which allows manual contact with a latch release portion 306.

Figure 2:
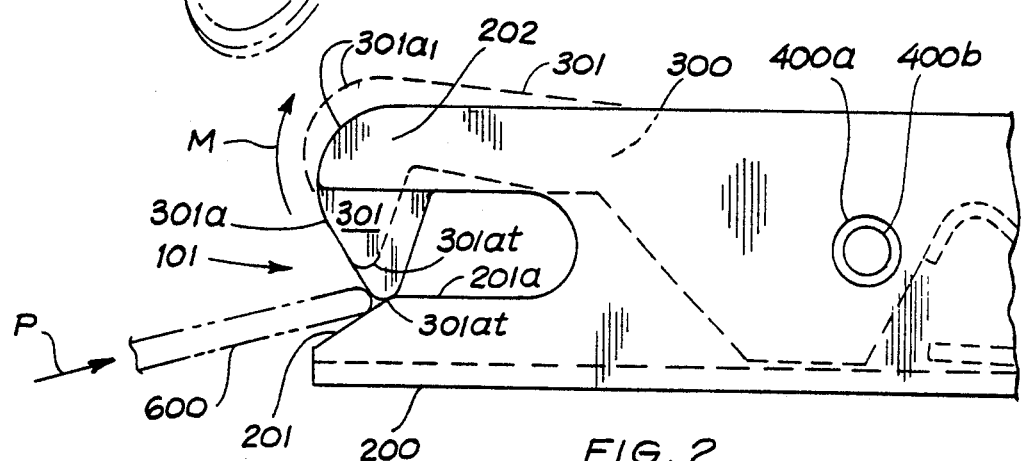
FIG. 2 is a partial side view of the receiving-end of the article retaining apparatus illustrating an article acting on a V-shaped entry-way delineated by the beveled entry portion of the casing and the beveled outer surface of the hook-end portion of the latch member to produce a moment about a pivot to enable securement.
Figure 3:
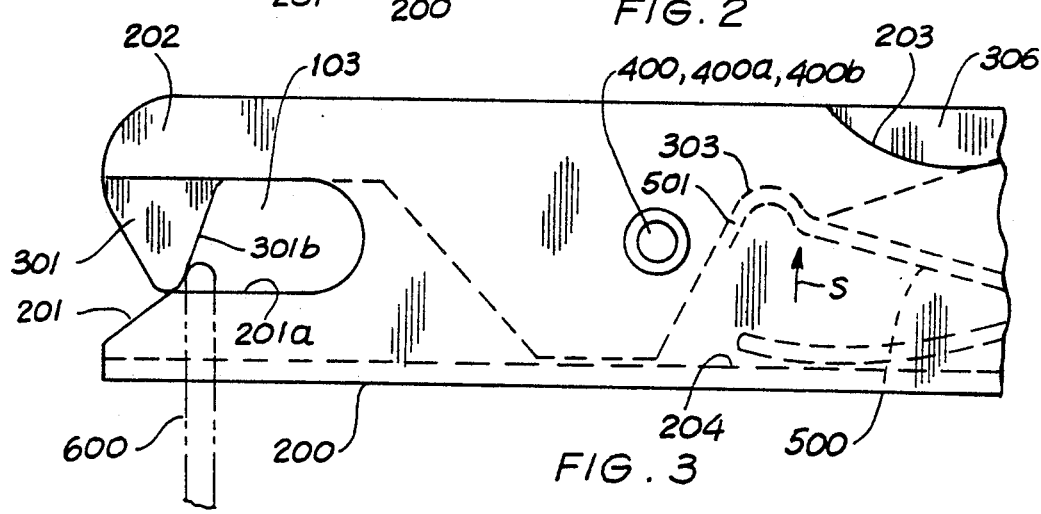
FIG. 3 is a partial side view of the receiving-end of the article retaining apparatus illustrating an article in a secured state behind the hook-end portion and proximate the inner sloped surface of the hook-end portion, and within a reversed view of a C-shaped article retaining region.

The engagement means comprises an article receiving-end portion 101 located at a distal end of housing body 200, and an outer surface portion 301a of hook-end body 301. Article receiving-end portion 101 being formed having a lower, beveled entry portion 201, and an upper latch hook-end housing portion 202. Entry portion 201 and hook-end housing portion 202 delineate an elongated C-shaped recessed region 103, shown in a reversed view. Article 600, or another split ring type article, not shown, may be more permanently attached using the auxiliary securement eyelet 102. As best seen in FIG. 2, and also referring to FIGS. 3 and 5, outer surface portion 301a of hook-end body 301 is formed having a beveled surface which curves inward towards the C-shaped region 103 beginning at a point enumerated 301al and extending towards a hook-end tip portion enumerated 301at. Beveled surface 301a, in combination with lower beveled entry portion 201, delineate a substantially V-shaped entry-way for receiving an article.

The disengagement means comprises an edge member 201a, associated with C-shaped recessed region 103, and a sloping inner surface 301b associated with hook-end body 301. Edge member 201a extending towards adjoining lower beveled entry portion 201. Inner surface 301b having a sloping surface oriented outwardly from C-shaped recessed region 103 and joining outer surface 301a of hook-end body 301 at a tip portion 301at. Inner surface 301b and edge member 201a delineating a substantially V-shaped exit-way for receiving an article to be released.

As discussed above, latch member 300 is pivotally encased in housing member 200 by means of a pivot 400. Pivot 400 comprises a hole portion 400a formed on housing 200, and is sized to receive a pin 400b to effect a pivot. As best seen in FIG. 5, spring member 500 comprises a hook portion 501, a neck portion 502, an upper elongated portion 503, and a lower elongated portion 504. Spring hook portion 501 and neck portion 502 conform to latch spring contact portions 303 and 303a of latch member 300. Latch end portion 304 is formed having a slope such that eyelet 102 is cleared when latch release portion 306 is utilized, see FIG. 4b. In the latched state, spring 500 exerts a force S by virtue of being positioned in the housing 200 and in contact with the bottom portion 204 of housing 200 and the latch contact portions 303, 303a, see FIG. 3. The latched state causes hook-end portion 301 to be positioned under tension at the mouth of elongated C-shaped recessed region 103, see also FIG. 3. Thus, as best seen in FIG. 2, article 600 is positioned at the V-shaped entry-way at tip portion 301at. Upon exerting a pushing force P sufficient to overcome the spring tension force S, a moment is produced about pivot 400. Once force P overcomes force S, hook-end portion 301 rotates toward housing end portion 202 as indicated by motion arrow M. By continuing the forward motion of force P, article 600 will travel past tip portion 301at to be secured within region 103, see FIG. 3. The securement of article 600 in region 103 relieves the force P countering force S, causing the hook-end portion 301 to return to the latched state across the mouth of region 103. In the secured state, article 600 is bound by edge member 201a and inner surface 301b, see FIG. 3.

Figure 4A:
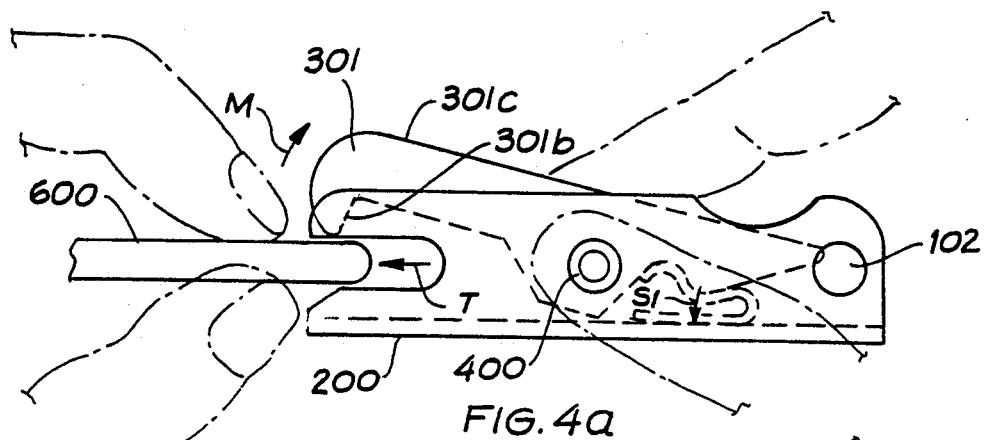
FIG. 4a is a side view of the article retaining apparatus of the present invention illustrating a pull-type release of a retained ring article, whereby the inner sloped surface structure on the hook-end portion, upon being urged by the article in the indicated direction, produces a moment producing pivotal motion on the spring-loaded latch to effect the release of the article according to the present invention.

As best illustrated in FIG. 4a, to release article 600 from its secured position, a pulling, or a tugging, force T is exerted by article 600 on the V-shaped exit-way to produce a moment about pivot 400. As in the push-type securement, force T must overcome tension S to produce motion M and the resulting compression of spring 500 as shown by arrow S1. By continuing to exert force T, article 600 will travel past tip portion 301at to a released state. Once article 600 is released, hook-end 301 will return back across the mouth of the C-shaped recessed region 103 due to the force T being removed, leaving only the spring tension S acting on latch member 300.

Thus, as described above in the preferred embodiment, the engagement means and the disengagement means facilitate producing a moment about mechanical pivot 400 whereby the spring-loaded latch member 300 is pivotally rotated to effect either a push-type securement or a pull-type release of an article.

Figure 4B:
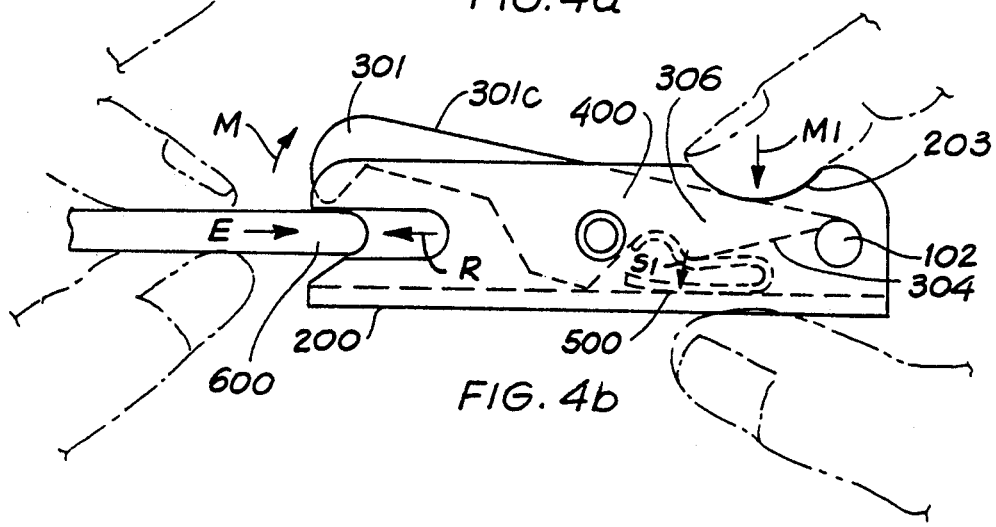
FIG. 4b is a side view of the article retaining apparatus of the present invention illustrating an alternative method of engaging or releasing a ring article, whereby the moment on spring-loaded latch is produced by manually depressing on a latch manipulation portion which protrudes into a cutaway formation of the casing.
Figure 5:
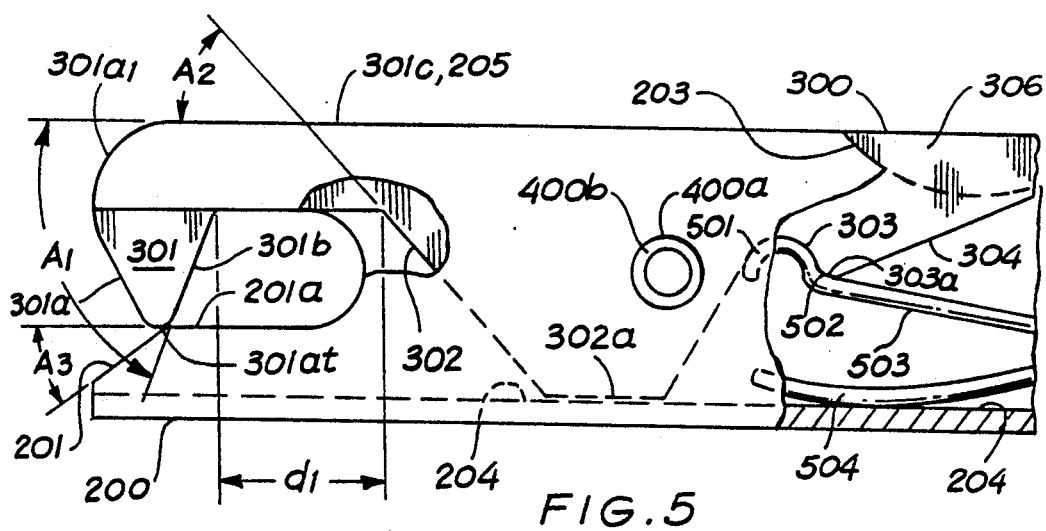
FIG. 5 is a partial side view of the article retaining apparatus illustrating the beveled lower entry portion of the receiving-end, the beveled outer surface and the inner sloped surface of the hook-end portion of the latch, the pivot, the spring, and the casing cutaway formation for latch manipulation.

Referring now to FIG. 4b, where the second set of complementary latching and unlatching structural arrangement is illustrated producing the moment about pivot 400 in an alternative manner. The alternative manner of producing the moment provides a means for a user of the apparatus of the present invention to manipulate latch member 300 to secure or release an article 600 in an unimpeded manner. As illustrated, and by example only, a user's index finger depresses latch release portion 306 in the direction of force M1 until the ball of the finger conforms with the cutout formation 203. As in the push-type securement and pull-type release of an article, force M1 must overcome tension S to produce motion M and the resulting compression of spring 500, as shown by arrow S1. By continuing to exert force M1, article 600 may be either engaged, as indicated by arrow E, or removed from the region 103, as indicated by arrow R, in an unimpeded manner. Once the article is secured, or released, removal of force M1 will result in hook-end 301 returning back across the mouth of the C-shaped recessed region 103 due to the spring tensin S acting on latch member 300.

FIG. 5 illustrates a partial cut away view of apparatus 100 where of interest are the angles A1, A2, and A3. Angle A1 relates to the outwardly oriented direction of sloping inner surface 301b, referenced with respect to edge 301c of latch member 300 which coincides wedge 205 of housing 200 when latch member 300 is in a latched state. Angle A1, being less than 90 degrees, and preferably on the order of 70 degrees, facilitates the formation of the V-shaped exit-way delineated by surface 301b and edge 201a, such that, when an article is positioned in the V-shape exit-way and forced outward, a moment will be produced about pivot 400. Similarly, angle A3, being less than 45 degrees and preferably on the order of 35 degrees, with respect to edge 201a, facilitates the formation of the V-shaped entry-way delineated by surface 301a and lower entry portion 201, such that, when an article is positioned in the V-shape entry-way and forced inward, a moment will be produced about pivot 400. Angle A2 relates to the slope associated with side 302 which begins a distance d1 from an upper corner of inner surface 301b and leads to a bottom seat portion 302a of latch member 300 which rests at bottom 204 of housing 200.

Therefore, while the present invention has been shown and described herein in what is believed to be the most practical and preferred embodiment, it is recognized that departures can be made therefrom within the scope of the invention, which scope is therefore not to be limited to the details disclosed herein but is to be accorded the full scope of the claims so as to embrace any and all equivalent apparatus.

I claim:

1. An article retaining apparatus, said apparatus comprising:

a housing member; and a spring-loaded latch member pivotally encased in said housing member, said latch member comprising a hook-end body portion, said housing member and said encased latch member forming a first set of complementary structure at an article receiving-end of said apparatus, said first set of complementary structure comprising, a V-shaped article engagement entry-way structure that facilitates a push-type securement of an article, and a V-shaped article disengagement exit-way structure that facilitates a pull-type release of a secured article, said engagement entry-way structure and said disengagement exit-way structure comprising said hook-end body portion having entry and exit surface structure formed to facilitate said body portion being pivotally responsive in an upward direction to a pushing force that effects said push-type securement of an article, and for being similarly pivotally responsive in an upward direction to a pulling force that effects said pull-type release of an article.

2. An article retaining apparatus, as described in claim 1, wherein said housing member and said encased latch member further comprise:

forming a second set of complementary structure disposed on said apparatus a distance away from said first complementary structure, said second set of complementary structure comprising, said spring-loaded latch member having an exposed latch release portion for momentarily manipulating said hook-end body portion to pivot in an upward direction to effect latching and unlatching an article without using a pushing or pulling force on the article, and said housing member having a formation for facilitating contact with said exposed latch release portion.

3. An article retaining apparatus, as described in claim 1, wherein:

said article receiving-end comprises an elongated C-shaped recessed region wherein said hook-end body portion is disposed, said entry surface structure comprises an outwardly-facing beveled surface which curves inward towards said C-shaped recessed region, said outwardly-facing, inwardly curving, beveled surface, in combination with a lower, beveled entry housing portion, delineating said V-shaped article engagement entry-way structure that facilitates said hook-end body portion being pivotally responsive in said upward direction, said beveled entry housing portion being beveled approximately 35 degrees with respect to an adjoining lower edge housing portion of said C-shaped recessed region, said exit surface structure comprising an inwardly-facing beveled surface which tapers outwardly from said C-shaped recessed region at an angle measuring approximately 70 degrees with respect to a top edge portion of said latch member, and said inwardly-facing, outwardly tapering beveled surface, in combination with said lower edge housing portion, delineating said V-shaped article disengagement exit-way structure that facilitates said hook-end body portion being pivotally responsive in said upward direction.

4. An article retaining apparatus, said apparatus comprising:

a housing member; and a spring-loaded latch member pivotally encased in said housing member, said housing member and said encased latch member forming a first and second set of complementary latching and unlatching structure, said first set of complementary latching and unlatching structure comprising:

an article securement region of said housing member, and a hook-end body portion of said latch member being disposed within said securement region, said hook-end body portion having an outwardly-facing beveled surface which curves inward towards said securement region, said inwardly curving, beveled surface, in combination with a beveled entry housing portion of said securement region, delineating a V-shaped article engagement entry-way structure that facilitates said hook-end body portion being pivotally responsive in an upward direction to a pushing force that facilitates a push-type securement of an article, said beveled entry housing portion measuring approximately 35 degrees with respect to an adjoining lower edge housing portion of said securement region, and said hook-end body portion also having an inwardly-facing beveled surface which tapers outwardly from said securement region at an angle measuring approximately 70 degrees with respect to a top edge portion of said latch member, said inwardly-facing, outwardly tapering beveled surface, in combination with said lower edge housing portion of said securement region, delineating a V-shaped article disengagement exit-way structure that facilitates said hook-end body portion being pivotally responsive in an upward direction to facilitate a pull-type release of a secured article.

5. An article retaining apparatus, as described in claim 4, wherein said second set of complementary latching and unlatching structure comprises:

said spring-loaded latch member having an exposed latch release portion for momentarily manipulating said hook-end body portion to pivot in an upward direction to effect latching and unlatching an article without using a pushing or pulling force on the article, and said housing member having a formation for facilitating contact with said exposed latch release portion.

6. An article retaining apparatus including a housing member and a spring-loaded latch member pivotally encased in said housing member, said apparatus comprising:

engagement structure for facilitating a push-type securement of an article, said engagement structure comprising a hook-end latch body portion and a beveled entry housing portion beveled approximately 35 degrees with respect to an adjoining lower edge housing portion;

disengagement structure for facilitating a pull-type release of a secured article, said disengagement structure comprising an inner surface of said hook-end latch body portion tapered outwardly at approximately 70 with respect to an upper edge of said latch member; and auxiliary release structure for selectively effecting engagement and disengagement of an article, said engagement structure, said disengagement structure and said auxiliary release structure each being able to produce an identical moment about a mechanical pivot connecting said spring-loaded latch member to said housing member.

7. A method of latching and unlatching an article, to and from a retaining apparatus, said method comprising the steps of:

(a) providing an article retaining apparatus, said apparatus comprising:

a housing member; and a spring-loaded latch member pivotally encased in said housing member, said housing member and said encased latch member forming a first set of complementary structure at a distal end of said apparatus, said first set of complementary structure comprising, engagement structure for facilitating push-type securement of an article;

disengagement structure for facilitating pull-type release of said secured article; and auxiliary release structure for selectively engaging and disengaging an article, said engagement structure, said disengagement structure and said auxiliary release structre each having respective structure for producing an identical moment about a mechanical pivot connecting said spring-loaded latch member to said housing member;

(b) providing an article to be secured by said retaining apparatus, said article having structure for facilitating being retained by said retaining apparatus;

(c) engaging, in a push-type manner, said provided article with said engagement structure and producing said moment to facilitate securement of said provided article;

(d) disengaging, in a pull-type manner, said secured article by urging against said disengagement structure and producing said moment to facilitate release of said secured article; and (e) alternatively manipulating said auxiliary release structure to produce said moment and selectively engage and disengage said provided article.

* * * * *